(12) United States Patent
Ogura

(10) Patent No.: US 11,033,983 B2
(45) Date of Patent: Jun. 15, 2021

(54) METHOD FOR CLEANING NOZZLE AND LASER MACHINING APPARATUS

(71) Applicant: SUGINO MACHINE LIMITED, Uozu (JP)

(72) Inventor: Takahiro Ogura, Uozu (JP)

(73) Assignee: SUGINO MACHINE LIMITED, Uozu (JP)

( * ) Notice: Subject to any disclaimer, the term of this patent is extended or adjusted under 35 U.S.C. 154(b) by 898 days.

(21) Appl. No.: 15/405,696

(22) Filed: Jan. 13, 2017

(65) Prior Publication Data
US 2018/0009063 A1  Jan. 11, 2018

(30) Foreign Application Priority Data
Jul. 8, 2016 (JP) .............................. JP2016-135629

(51) Int. Cl.
*B23K 26/14* (2014.01)
*B23K 26/16* (2006.01)
*B23K 26/146* (2014.01)

(52) U.S. Cl.
CPC ........ *B23K 26/1494* (2013.01); *B23K 26/146* (2015.10); *B23K 26/16* (2013.01)

(58) Field of Classification Search
CPC ..................................................... B23K 26/14
USPC ........................ 134/1–1.3; 219/121.6–121.86
See application file for complete search history.

(56) References Cited

U.S. PATENT DOCUMENTS

| | | | | |
|---|---|---|---|---|
| 5,257,706 A | * | 11/1993 | McIntyre | B23K 26/16 219/121.61 |
| 6,573,702 B2 | * | 6/2003 | Marcuse | B08B 7/0035 134/1 |
| 6,709,269 B1 | * | 3/2004 | Altshuler | A61C 1/0046 433/215 |
| 8,946,588 B2 | * | 2/2015 | Suruceanu | B23K 26/382 219/121.71 |
| 2003/0052101 A1 | * | 3/2003 | Gu | B08B 7/0042 219/121.71 |
| 2009/0084765 A1 | * | 4/2009 | Muratsubaki | B23K 26/146 219/121.67 |
| 2010/0160838 A1 | * | 6/2010 | Krespi | A61N 5/0624 601/15 |

(Continued)

FOREIGN PATENT DOCUMENTS

JP          05318165 A   *  5/1992
JP       2013-006212 A      1/2013

*Primary Examiner* — Ibrahime A Abraham
*Assistant Examiner* — Elizabeth M Sims
(74) *Attorney, Agent, or Firm* — Oliff PLC

(57) ABSTRACT

The technical problems to be solved are to keep the vicinity of the nozzle opening clean and to restrain the jet liquid column from tilting. The solution to problems lies in a method for cleaning a nozzle of a laser machining apparatus to process a work piece to be processed by a laser beam introduced into a jet liquid column, the method comprising the steps of: forming the jet liquid column by jetting a liquid from the nozzle; and irradiating a spot 30 of the laser beam onto a vicinal section of an inlet opening 22c of the nozzle in such a state that a peak power per unit area of the spot 30 of the laser beam irradiated on a surface provided with the inlet opening 22c of the nozzle does not go beyond a threshold value at which the nozzle is damaged and removing foreign matters attached on the surface.

2 Claims, 9 Drawing Sheets

(56) References Cited

U.S. PATENT DOCUMENTS

2015/0209936 A1\* 7/2015 Ihara ...................... B26F 3/004
239/589

\* cited by examiner

METHOD FOR CLEANING NOZZLE AND LASER MACHINING APPARATUS

TECHNICAL FIELD

The present invention relates to a method for cleaning a nozzle of a laser machining apparatus to work on a work piece to be processed by a laser beam introduced within a jet liquid column and the laser machining apparatus.

BACKGROUND ART

A technique by which a laser beam is introduced within a jet liquid column is disclosed (e.g. in Japanese Patent Unexamined Application Publication No. 2013-6212: reference being especially made to recitation of claim 1 and illustration of FIG. 1), in which a laser beam is introduced within a jet liquid column by converging a laser beam onto a liquid column jetted through a nozzle from a window provided on a surface opposed to the nozzle so that such beam is focused on the vicinity of a nozzle opening.

SUMMARY

In the prior invention disclosed in Japanese Patent Unexamined Application Publication No. 2013-6212, there are cases where impurities solved in a purified water accumulate on the vicinity of a nozzle opening when such purified water is adopted for a liquid to form a jet liquid column. Such unfavorable accumulation disturbs the liquid flow through the upstream section of the nozzle opening, as the result of which it occurs that the jet liquid column tilts. The present invention is to keep the vicinity of the nozzle opening clean so as to restrain the jet liquid column from tilting.

In view of the foregoing, one aspect of the present invention is directed to a method for cleaning a nozzle of a laser machining apparatus to work on a work piece to be processed by a laser beam introduced within a jet liquid column, the method comprising the steps of: forming a jet liquid column by jetting a liquid from the nozzle; and irradiating a spot of the laser beam to the vicinity of an inlet opening of the nozzle in such a manner that a peak power (maximum intensity of pulsed laser) per unit area of a spot of the laser beam irradiated onto a surface of the nozzle provided with the inlet opening does not go beyond a threshold value at which the nozzle is damaged so as to remove foreign matters attached on such surface.

According to the above arrangement, the foreign matters accumulated on the periphery of the nozzle inlet opening are spalled by the irradiation of the laser beam. The spalled foreign matters flow out of the jet liquid column jetted from the nozzle inlet opening. Now, due to the fact that a peak power per unit area of a spot of the laser beam irradiated onto a surface of the nozzle provided with the inlet opening does not go beyond a threshold value at which the nozzle is damaged, there is no case where the irradiated laser beam damages the nozzle. Thus, according to the present invention, the nozzle inlet opening can be cleaned without damaging the nozzle onto which a laser beam is irradiated, with the result that it restrains the jet liquid column from tilting. It should be noted that the technical problems, specific arrangements and advantageous effects other than described above are clarified with the following embodiments.

DESCRIPTION OF EMBODIMENTS

First Embodiment

Figure 1:
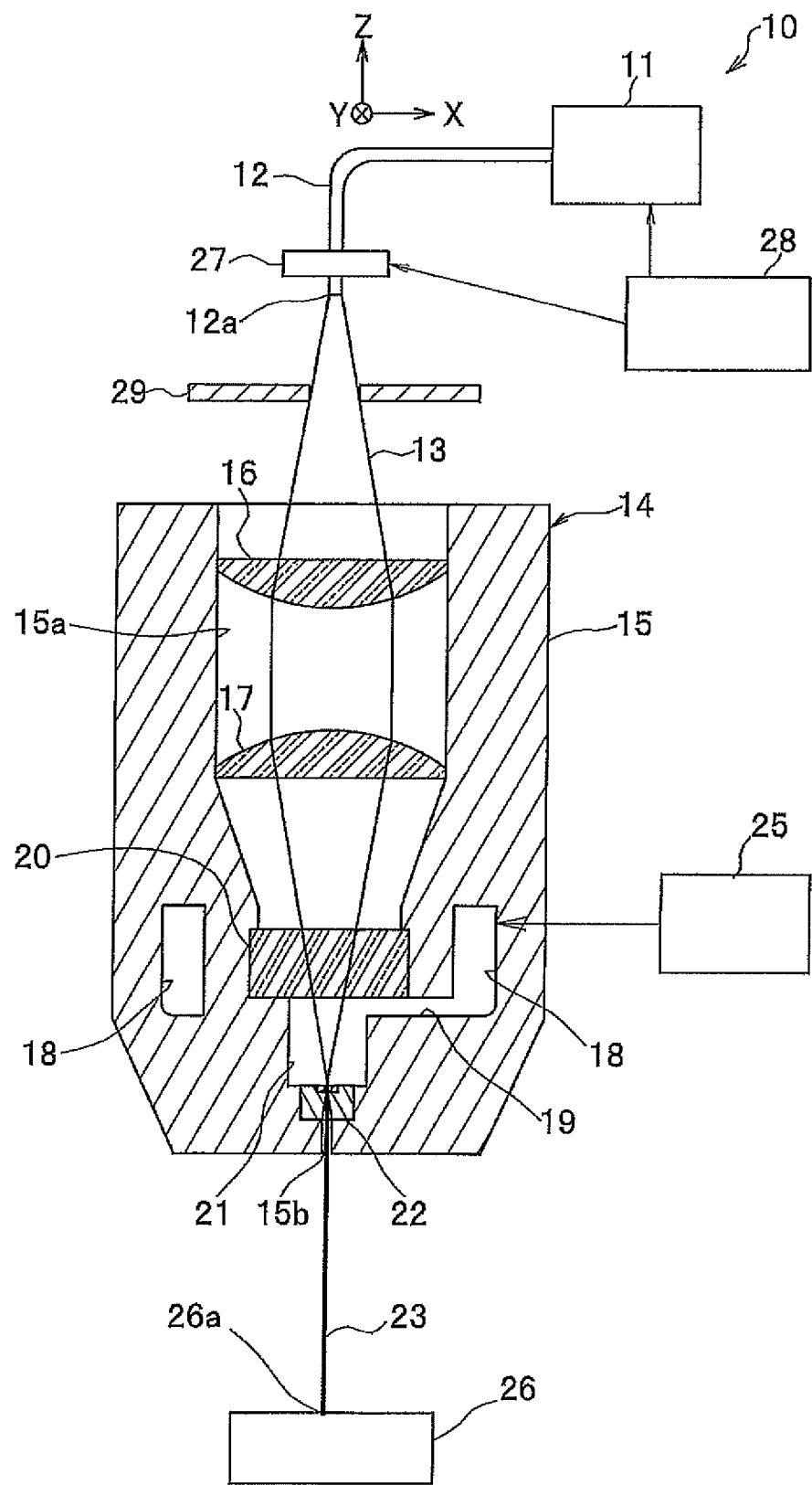
FIG. 1 is a longitudinal cross-sectional view of a laser machining apparatus according to the first embodiment of the present invention.

Hereafter, the first embodiment of the present invention is described with reference to the accompanying drawings. FIG. 1 illustrates the longitudinal cross-sectional view of a laser machining apparatus 10 embodied herein. The laser machining apparatus 10 comprises a laser oscillator 11; a machining head 14 and a pump 25. The second-harmonic pulsed Nd:YAG laser (in the wavelength of 532 nm) is adoptable for the laser oscillator 11. The laser oscillator 11 generates a pulsed laser beam.

As illustrated in FIG. 1, the machining head 14 adopts the following arrangement. On the illustrated upper side (on the upstream side in the optical axis direction of a laser beam 13), the cylindrical body 15 is provided with a cylindrical hollow-out section 15a through which a laser beam 13 passes. Below the hollow-out section 15a, a cylindrical window 20 is provided. This window 20 is made of such a transparent and highly strong material as sapphire glass. In the periphery of the window 20, a rectification chamber 18 forming a doughnut-shaped space is provided. The cross-sectional shape of the rectification chamber 18 is rectangular. Below the window 20, a liquid excitation chamber (liquid reception chamber) 21 which is a cylindrical space is provided. The liquid excitation chamber 21 and the rectification chamber 18 are in communication with each other through a communicating passage 19. Viewed from the center axis of a jet liquid column 23 (based on planar view), the communicating passage 19 takes a fan shape with its center angle ranging from 30 degrees to 120 degrees, the thickness of the passage in the elevational direction being in the order of one fourth of the height of the liquid excitation chamber 21. Below the liquid excitation chamber 21 (on the downstream side in the optical axis direction of the laser beam 13), a cylindrical nozzle 22 as described below is provided. Below the nozzle 22 (in the optical axis direction of the laser beam 13 and on the downstream side in the flowing direction of the jet liquid column 23), a get-through passage 15*b* through which the jet liquid column 23 passes is provided.

A piston pump is adoptable for the pump 25, by way of one example. It is preferred that the pump 25 entail smaller change in pressure waveform. For the pump 25, that disclosed in e.g. Japanese Patent Registration No. 3508378 is adoptable. A high-pressure liquid discharged from the pump 25 is jetted from the nozzle 22 in the form of the jet liquid column 23 via the rectification chamber 18, the communicating passage 19 and the liquid excitation chamber 21. In the present embodiment, purified water (deionized water or ultrafiltration water) is adopted for the liquid which forms the jet liquid column 23.

Figure 2:
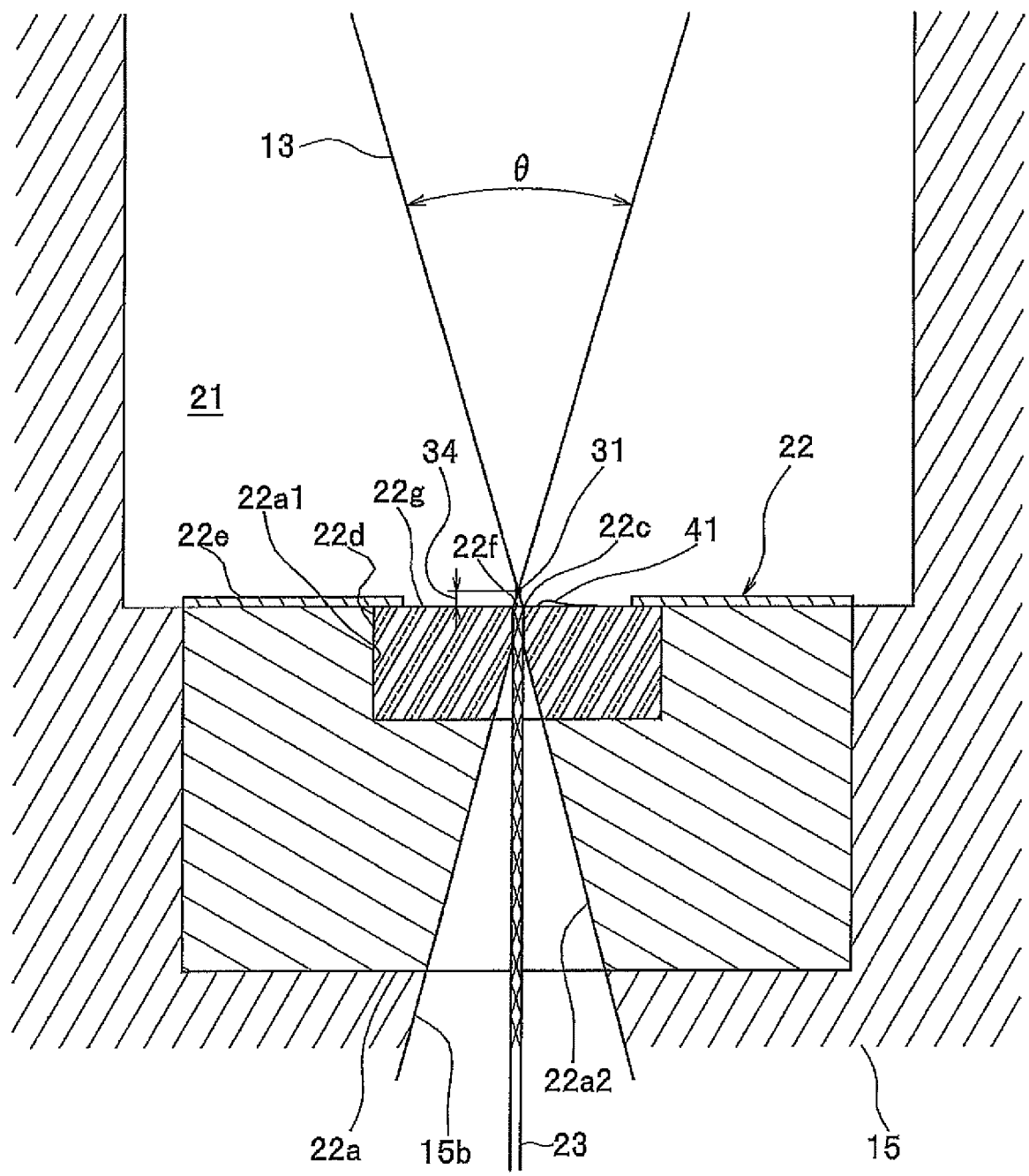
FIG. 2 is an enlarged view in the vicinity of a nozzle inlet opening of FIG. 1.

With reference to FIG. 2, the nozzle 22 is described. The nozzle 22 is provided with a main body 22*a*, a nozzle body 22*d* having a nozzle hole 22*f* and a protection film 22*e*. The main body 22*a* takes a cylindrical shape and has a substantially cylindrical recess 22*a*1 on the upper part thereof. The main body 22*a* has a conical passage 22*a*2 on the lower part thereof. The passage 22*a*2 is provided in communication with the nozzle hole 22*f*, through which the jet liquid column 23 passes. In the recess 22*a*1, the nozzle body 22*d* is provided. The nozzle body 22*d* is made of diamond, corundum or other gemstone, by way of some examples. The nozzle body 22*d* is integrated with the main body 22*a*. The upper surface of the main body 22*a* and that of the nozzle body 22*d* form a surface 22*g* in the same plane. The nozzle hole 22*f* opens through the surface 22*g*, the opening section of which corresponds to an inlet opening 22*c*. Then, on the upper surface of the main body 22*a*, the protection film 22*e* is provided in such a manner it covers a part of the nozzle body 22*d*. The protection film 22*e* is firmly attached to the main body 22*a* and the nozzle body 22*d*. It is purified water that flows through the nozzle 22, in which purified water has a high dissolution property so that it dissolves the main body 22*a*. The protection film 22*e* protects the surface of the main body 22*a* from purified water. To note, the protection film 22*e* is not necessarily provided to the nozzle.

Figure 4:
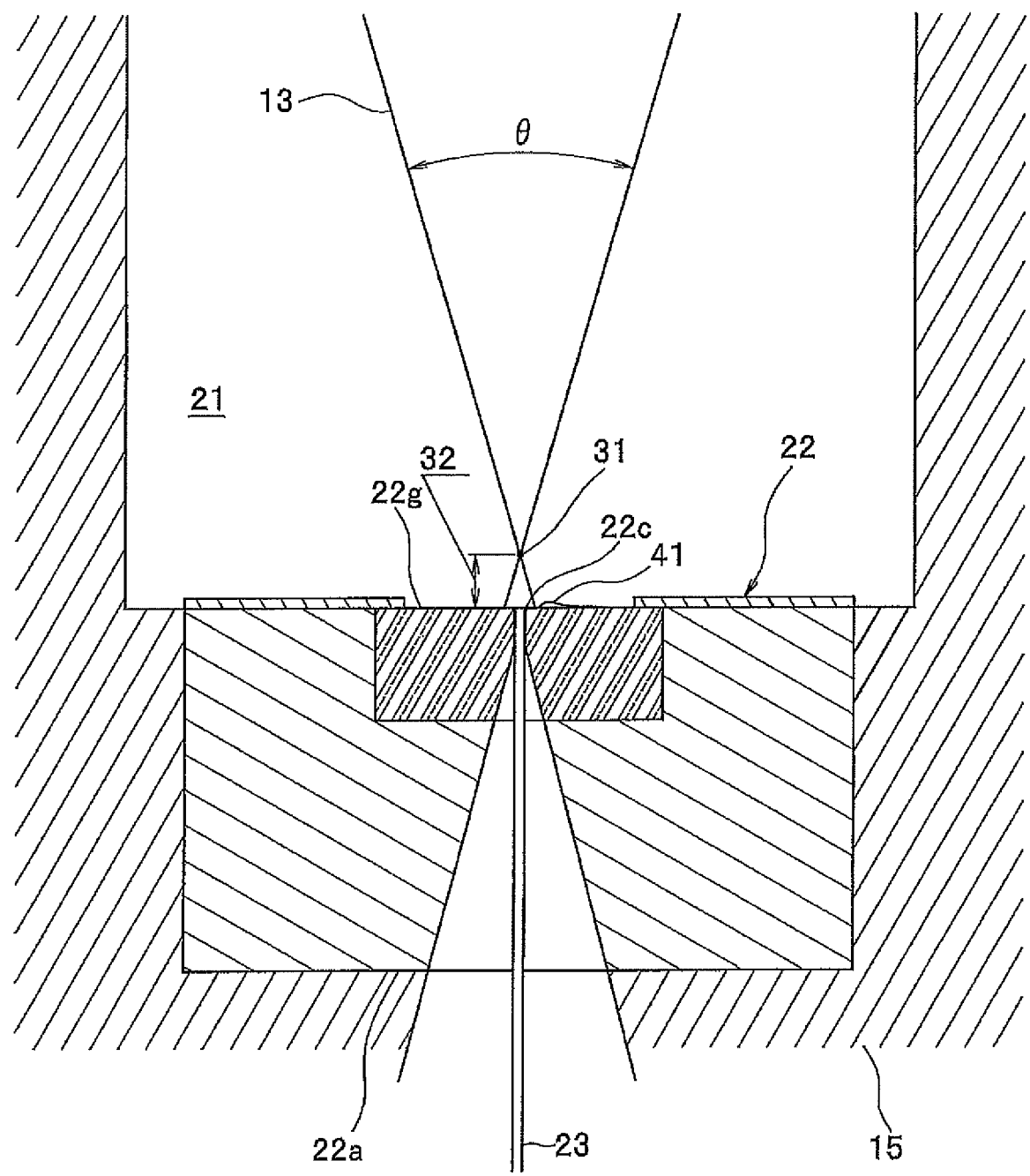
FIG. 4 is an enlarged longitudinal cross-sectional view illustrating a method for cleaning a nozzle according to the first embodiment of the present invention.

Upon operating the laser machining apparatus 10, metals and the like dissolved from the machining head 14 and the nozzle 22 are deposited on the surface 22*g* (see FIG. 4) on which the inlet opening 22*c* of the nozzle body 22*d* is disposed. Foreign matters 41 (see FIG. 4) attached on the surface of the nozzle body 22*d* disturb the liquid flow in the surrounding of the inlet opening 22*c* incorporated in the liquid excitation chamber 21, as the result of which the jet liquid column 23 tilts slightly from the center of the machining head 14.

With reference to FIGS. 1 and 2, the laser beam 13 generated by the laser oscillator 11 is led to the machining head 14 by an optical fiber 12 which is a light guide body. The laser beam 13 emitted from a tip end portion 12*a* of the optical fiber 12 is converged at a focal point 31 in the vicinity of the inlet opening 22*c* of the nozzle 22 via an aperture 29, a collimator lens 16 and an objection lens 17. The laser beam 13 converged at the focal point 31 is led into the jet liquid column 23. The laser beam 13 is led into the jet liquid column so as to reach a work piece 26 to be processed. The laser beam 13 machines a machining point 26*a* between the work piece 26 to be processed and the jet liquid column 23.

The tip end portion 12*a* of the optical fiber 12 can move relatively to the nozzle 22 by means of a shifting device 27. An orthogonal axis type shifting device, which shifts along a Z axis corresponding to the axial direction of the jet liquid column 23 and an X axis and a Y axis which are perpendicular to the Z axis and perpendicular to each other, is adoptable for the shifting device 27. The shifting device 27 comprises a linear guide along the respective axes, a ball screw mechanism and a feeding mechanism combined with a stepping motor. The shifting device 27 shifts according to a driving current fed from a control device 28. To note, the shifting device 27 may comprise a servo motor instead of the stepping motor and a linear motor instead of the ball screw mechanism. The expressional representations of the axes or X, Y and Z as above are of course replaceable with other representations.

In the state where a work piece 26 to be processed is machined (at the time of machining), the laser beam 13 emitted from the optical fiber 12 is converged at the position (focal point 31) slightly displaced to the window 20 (on the upstream side in the optical axis of the laser beam 13) from the inlet opening 22*c*. The interval between the focal point 31 at this time and the surface 22*g* is defined as a distance 34. Then, the laser beam 13 is led into the jet liquid column 23 jetted from the inlet opening 22*c*. During the machining operation, a spot 30 of the laser beam (see FIG. 5) smaller in diameter than that of the optical fiber 12 is formed on the inlet opening 22*c*. Thus, an amount by which the optical fiber 12 shifts is projected with reduction on the surface 22*g* including the inlet opening 22*c* according to the proportional ratio of the diameter of the optical fiber 12 to a spot diameter 33 (see FIG. 5). In other words, an amount by which the optical fiber 12 shifts is designed larger than an amount by which the spot 30 of the laser beam shifts.

The control device 28 controls the laser oscillator 11 and the shifting device 27. In detail, the control device 28 adjusts an output power of the laser oscillator 11 to a value optimal for machining and cleaning. Then, the control device 28 feeds a driving current pulse to a motor of the respective axes of the shifting device 27 in order to precisely position or scan the tip end portion 12 of the optical fiber 12. When the control device 28 scans the spot 30 of the laser beam 13, it calculates an amount by which the tip end portion 12*a* of the optical fiber 12 shifts and a speed by which such tip end portion shifts based on the scanning amount of the spot 30 of the laser beam and the magnification of optical lenses respectively and scans such tip end portion.

To note, the control device 28 may store the preset scanning amount of the optical fiber 12 based on the numerical values of the preset magnification of the optical lenses 16 and 17, the preset aperture value of the aperture 29 and the preset scanning amount of the spot 30 of the laser beam. In this case, the control device 28 controls the shifting device 27 so that the optical fiber 12 shifts along a track defined by the position of the optical fiber 12 at the time of machining being defined as a reference position and such reference position being taken as a starting point.

Figure 3:
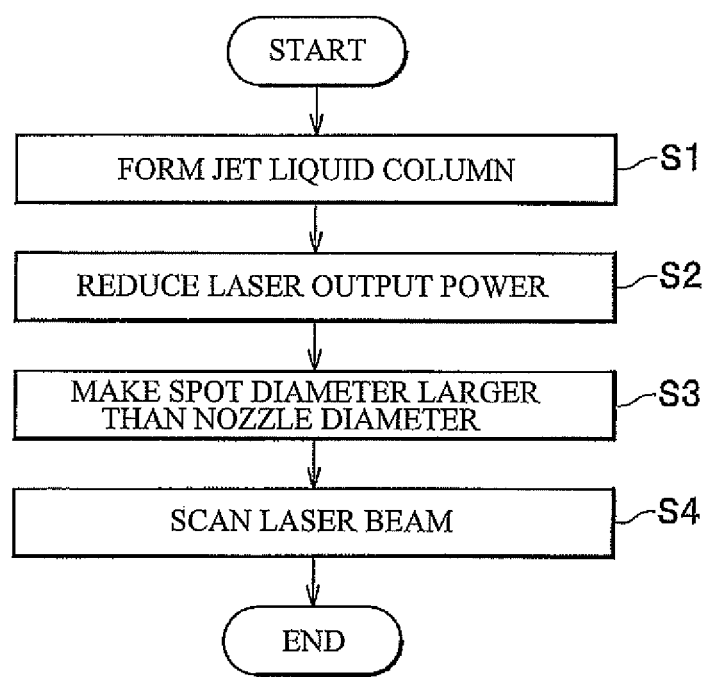
FIG. 3 is a flow chart illustrating a method for cleaning a nozzle according to the first embodiment of the present invention.

Mainly with reference to FIG. 3, a method for cleaning the nozzle 22 employing the laser beam 13 (see FIG. 1) is described. The laser machining apparatus 10 forms the jet liquid column 23 (S1). Then, the laser machining apparatus 10 reduces the output power of the laser beam 13 (S2). The laser machining apparatus 10 enlarges the spot diameter 33 (see FIG. 5) of the spot 30 of the laser beam generated by the laser beam 13 being irradiated onto the surface 22*g* (S3). Lastly, the laser machining apparatus 10 scans the laser beam 13 and removes the foreign matters 41 (see FIG. 4) attached on the periphery of the inlet opening 22*c* (S4). To note, the steps 2 and 3 may be taken at the same time or their procedural order may be reversed.

Now, Steps S1 to S4 are described in detail. Step S1 is as follows. Upon the pump 25 of the laser machining apparatus 10 being operated, the liquid flows into the liquid excitation chamber 21. The diameter of the nozzle hole 22f embodied herein is very small or e.g. within the range from 0.04 mm to 0.1 mm, so that it is clogged just with a small amount of foreign matters attached thereto. At Step S1, the jet liquid column 23 is formed, thereby, the foreign matters 41 spalled by the laser beam 13 are flowed out of the nozzle 22 along with the jet liquid column. The pressure applied to the jet liquid column at Step S1 may be adjusted so that it is different from that applied at the time of machining.

Explanation is given on Step S2. The control device 28 makes the output power of the laser beam 13 (hereinafter, simply referred to as 'laser output') generated by the laser oscillator 11 lower than that applied at the time of machining, which allows the spot diameter 33 (see FIG. 5) to be adjusted and makes it doubly sure that the peak power (W/mm$^2$) per unit area of the spot 30 of the laser beam irradiated on the surface 22g provided with the inlet opening 22c of the nozzle 22 does not go beyond a threshold value at which the nozzle 22 is damaged. To note, the peak power per unit area of the spot 30 of the laser beam irradiated on the surface 22g can be adjusted by increasing and decreasing the laser output or enlarging and reducing the size of the spot diameter 33.

The control device 28 sends a signal corresponding to an output required by the laser oscillator 11. The laser oscillator 11 modifies an output with the reception of such signal. This signal may be either an analog one according to a current value or a voltage value or a digital one. The peak power per unit area of the laser beam irradiated on the surface 22g reduces by the laser oscillator 11 reducing its laser output. The laser machining apparatus 10 machines a work piece 26 to be processed with a strong laser beam 13 with the output power ranging from 50 to 200 W. When such strong laser beam 13 is irradiated onto the nozzle 22 with a small spot of the laser beam, the nozzle body 22d is damaged. Thus, after or before the execution of Step S3 or at the same time, the laser output is reduced. The threshold value of the peak power per unit area of the laser beam is set so that the foreign matters 41 (see FIG. 6) attached on the nozzle 22 are spalled without damaging on the nozzle 22.

In this regard, the peak power per unit area obtained by dividing the peak power of the laser beam 13 by an area of the spot 30 of the laser beam is set at a threshold value at which the nozzle 22 is not damaged or smaller by a user (not shown in the drawings) of the laser machining apparatus 10. To note, such threshold value may be preliminarily stored in the control device 28.

For instance, when the nozzle body 22d of the nozzle 22 is made of diamond, such threshold can be set at 1.0 MW/mm$^2$. The inventors found that immediately when the peak power per unit area of the spot 30 of the laser beam 13 goes beyond a threshold value, the nozzle 22 is damaged irrespective of the duration in which the laser beam 13 is irradiated, but when the peak power per unit area of the laser beam 13 is at such threshold value or smaller, the nozzle 22 is free from damage. It is inferred that this threshold value is determined by the relation between the speed by which heat is diffused and the chemical bond strength of the crystalline structure. In turn, the foreign matters 41 attached on the nozzle 22 or those physically bonded to the nozzle body 22d can be satisfactorily removed even when the peak power per unit area of the laser beam 13 is lower than the set threshold value, because such physical bond strength is far lower than the breaking strength of the nozzle 22. Further, the longer the duration in which the laser beam 13 is irradiated is, the more the foreign matters 41 are removed.

Explanation is given on Step S3. With reference to FIG. 1, the tip end portion 12a of the optical fiber 12 can be positioned in the orthogonal three axial directions. The focal point 31 of the laser beam 13 shifts positionally within the liquid excitation chamber 21 by shifting the tip end of the optical fiber 12. In this regard, upon shifting the optical fiber 12 in the axial direction (in the Z axis direction), the focal point 31 (see FIG. 4) also shifts in the same axial direction. The spot 30 of the laser beam 13 irradiated onto the surface 22g is enlarged by making a distance 32 (see FIG. 4) of the focal point 31 from the surface 22g larger. The distance 32 is larger than the distance 34. In this respect, the diameter of the spot 30 of the laser beam is referred to as the spot diameter 33 (see FIG. 5). The peak power per unit area of the laser beam is reduced by making the spot diameter 33 larger. The spot diameter 33 is set according to the aforesaid peak power density. For instance, the spot diameter 33 is set two times or more as large as, but twenty times or less as large as the inlet opening diameter, which is preferably set two time or more as large as, but five times or less as large as the same.

The converging angle θθ (see FIG. 4) of the laser beam 13 is defined by the aperture 29 and the focal length of the pair of lenses 16 and 17. Then, when the laser beam 13 spread with passing through the focal point positioned within the liquid excitation chamber 21 forms the spot 30 (see FIG. 5) of the laser beam on the surface 22g (see FIG. 4), the spot diameter 33 (see FIG. 5) is defined by the distance 32 (see FIG. 4) between the focal point 31 (see FIG. 4) and the surface 22g, and the converging angle θ.

Thus, an amount ΔΔL (μμm) by which the distance 32 between the surface 22g and the focal point 31 should be increased at the time of cleaning is defined as formulated in the following Formula 1 based on a spot diameter DC (see Formula 1) at the time of cleaning and a spot diameter DM (see Formula 1) at the time of machining. The amount ΔΔL is a difference between the distance 32 and the distance 34. The control device 28 determines an amount ΔΔΔL (μμm) by which the distance 32 between the surface 22g and the focal point 31 should be increased at the time of cleaning according to Formula 1.

$$\Delta L = \frac{DC - DM}{2\tan\frac{\theta}{2}} \quad \text{(Formula 1)}$$

DC: Spot diameter at the time of cleaning (μμm)
DM: Spot diameter at the time of machining (μm)
θ: Converging angle(°)°)

In this regard, an amount by which the optical fiber 12 shifts in the Z direction and an amount by which the focal point of the laser beam 13 shifts in the Z direction are in inverse proportion to the focal length of the laser optical system. In other words, generally speaking, providing that the object distance from the object point to the lens is defined as 'a' and the image distance from the lens to the image point is defined as 'b', the focal length 'f' of such laser optical system is approximately expressed with the following formula 2.

$$\frac{1}{f} = \frac{1}{a} + \frac{1}{b} \quad \text{(Formula 2)}$$

According to the present embodiment, the control device 28 calculates a distance by which the focal point of the laser beam 13 shifts employing Formula 2. In other words, the object distance 'a' corresponds to a focal length of the collimator lens 16, this focal length being set at 400 mm. In turn, the image distance 'b' corresponds to a focal length of the converging lens 17, this focal length being set at 60 mm. Accordingly, the focal length 'f' of the laser optical system as a whole is 52.17 mm based on the Formula 2. Since the focal length 'f' of the optical system as a whole does not change just with the same laser optical system being used, the focal length 'b' of the converging lens 17 changes according as the focal length 'a' of the collimator lens 16 changes. For instance, when the optical fiber 12 is shifted above along the Z axis by 400 the focal point 31 (see FIG. 4) of the laser beam is shifted above approximately by 10 μm.μm The control device 28 can adjust the spot diameter 33 (see FIG. 5) according to the above formulae. To note, the control device 28 may mechanically drive the shifting device 27 through the sequence program and the like based on preliminarily computed spot diameter 33 and tuning parameter of laser output.

Explanation is given on Step S4. With reference to FIG. 1, when the optical fiber 12 is shifted on the plane (X-Y plane) perpendicular to the axial direction, both the focal point 31 and the spot 30 of the laser beam shift accordingly. The track 37 (see FIG. 5) along which the spot 30 of the laser beam scans the surface 22g is as follows. After the spot of the laser beam scans such surface only by a feed length 36 in the minus direction with respect to the Y direction, it shifts only by a certain distance (pitch 38) in the X direction and scans such surface in the positive direction with respect to the Y direction. Scanning is repeated in the same directions as the foregoing. Then, upon the spot 30 of the laser beam scanning such surface vertically and transversely within a square scanning range 39 centered on the inlet opening 22c (see FIG. 4), the foreign matters 41 found in the range which is subjected to the irradiation of the spot 30 of the laser beam are thermally spalled so as to be removed from the nozzle body 22d. In other words, the scanning range 39 (see FIG. 5) of the spot 30 of the laser beam encompasses a vicinal section 22h from which the foreign matters 41 are to be removed. In this regard, the feed length 36 (see FIG. 5) corresponds to the range covered by the vicinal section 22h (see FIG. 5) of the inlet opening 22c from which it is required the foreign matters 41 be removed.

Figure 5:
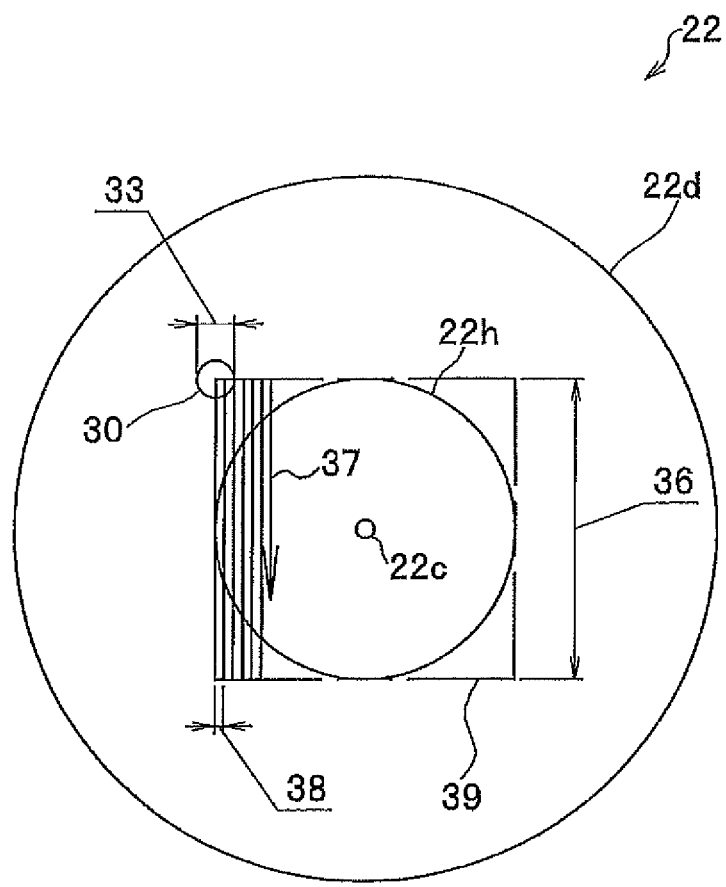
FIG. 5 is a view seen from the upper side of a nozzle illustrating a method for cleaning a nozzle according to the first embodiment of the present invention.

As illustrated in FIG. 5, the diameter of the vicinal section 22h is three times or more, but 20 times or less as large as the diameter of the inlet opening 22c centered on the opening, preferably, the former being five times or more, but 15 times or less as large as that of the latter. There is tendency that the thickness of the foreign matters 41 (see FIG. 4) attached on the surface 22g becomes thinner according as they are distant away from the inlet opening 22c. Further, according as the fluid approaches the inlet opening 22c, its flowing speed becomes faster. Thus, the vicinal section 22h of the inlet opening 22c largely affects the behavior of the fluid flowing into the inlet opening 22c.

The largeness by which the surrounding section of the nozzle body affects such behavior differs according to the flowing quantity of the jet liquid column 23 and the flowing speed of the fluid in the vicinity of the inlet opening. The present inventors specified the range of the vicinal section 22h in which cleaning effect is maximized as being in the order of 0.3 mm to 0.8 mm diametrically centered on the inlet opening 22c in the case where the diameter of the inlet opening 22c ranges from 40 μm to 100 μm μm to 100 μm as the result of repeated experiments under the general operating conditions adopted in the present embodiment. The inventors' conclusions are as follows.

In detail, the vicinal section whose diameter is more than 20 times as large as the diameter of the inlet opening 22c hardly affects the behavior of the fluid flowing in the vicinity of the inlet opening 22c or hardly affects such behavior even with the foreign matters 41 removed from there. Further, the vicinal section whose diameter is in the order of 15 times as large as the diameter of the inlet opening 22c (inlet opening diameter) was found enough to prevent the jet liquid column 23 from tilting through cleaning. On the contrary, as for the vicinal section whose diameter is on the order of three times as large as the inlet opening diameter, there are not much foreign matters 41 attached thereon due to the peripheral extension of the spot 30 of the laser beam 13 at the time of machining. It is required that such foreign matters 41 be removed from the vicinal section whose diameter is more than three times as large as the inlet opening diameter. As with the vicinal section whose diameter affects the behavior of the fluid flowing in the vicinity of the inlet opening 22c, it is preferred that the foreign matters 41 be removed from the vicinal section whose diameter is five times or more as large as the inlet opening diameter.

Moreover, the pitch 38 is set smaller than the spot diameter 33. The spot 30 of the laser beam scans the surface 22g so that the passing range in which it passes is partly overlapped. The pitch 38 is set at a value 0.1 times or more, but 0.9 times or less as large as the spot diameter 33, preferably, being set at a value 0.2 times or more, but 0.5 times or less as large as the latter. Since the laser beam 13 transmits through the optical lenses 16 and 17, the window 20 and the liquid contained in the liquid excitation chamber 21 after having passed through the aperture 29, the periphery of the spot 30 of the laser beam turns out to be indefinite in contour. In other words, the diametrical intensity distribution of the spot 30 of the laser beam is not in a definite stepped contour, but its periphery draws a smooth curve. In order that the foreign matters 41 are removed employing such spot 30 of the laser beam, it is preferred that the scanning range 39 be overlapped. Accordingly, the set value of the pitch 38 is largely affected by the aberration of the optical system in use. The above range of the vicinal section diametrically centered on the inlet opening found by the inventors as the result of repeated experiments corresponds to that allowing the foreign matters 41 to be completely removed in a stable manner without depending on any particular operating conditions.

At Step S4, the track along which the spot 30 of the laser beam shifts may be arranged spirally or circularly centered on the inlet opening 22c instead of the aforesaid reciprocal track. To note, on account that the protection film 22e (see FIG. 2) is easy to be peeled off, the track 37 is set so that the scanning range 39 does not cover the protection film 22e.

The control device 28 calculates an amount by which the optical fiber 12 shifts which corresponds to an amount by which the spot 30 of the laser beam shifts on the surface 22g. In other words, the amount by which the spot 30 of the laser beam shifts on the surface 22g is calculated by multiplying the proportional ratio of the diameter of the tip end portion 12a of the optical fiber 12 or the diameter of such tip end portion from which the laser beam is emitted to the spot diameter 33 by an amount by which the tip end portion 12a shifts. It is designed so that the amount by which the spot 30 of the laser beam shifts is smaller than that by which the optical fiber 12 shifts. The control device 28 shifts the tip end portion 12a of the optical fiber 12 with the shifting device 27 according to the aforesaid proportional ratio and along the track along which such tip end portion shifts and is made up by that along which the spot 30 of the laser beam shifts.

Mainly with reference to FIGS. 2 and 3, the operational effects of a method for cleaning a nozzle are described. On account that the jet liquid column 23 is formed at Step S1, the foreign matters 41 spalled at the posterior laser scanning (at Step S4) so as to be peeled off from the nozzle 22 flow out of the liquid excitation chamber 21. Thus, there is not any foreign matter 41 left within the liquid excitation chamber 21. At Steps S2 and S3, the spot diameter 33 is enlarged so that the peak power per unit area of the laser beam reduces. Therefore, upon the surface 22g of the nozzle 22 being scanned by the laser beam 13 at the laser scanning (at Step S4), no damage is done on the nozzle 22. At Step S4 or during the laser scanning, the laser beam 13 strong enough to remove the foreign matters 41 scans the periphery of the inlet opening 22c. In other words, the foreign matters 41 attached on the periphery of the inlet opening 22c are spalled so as to be removed with such laser scanning.

The behavior of the liquid flowing towards the inlet opening 22c largely affects the behavior of the liquid flow of the contraction flow part generated at the inlet opening 22c. When the foreign matters 41 are attached on the periphery of the inlet opening 22c of the surface 22g through which the inlet opening 22c of the nozzle 22 is provided, it makes the jet liquid column 23 tilt. The machining point 26a (see FIG. 1) at which a work piece 26 to be processed is machined by the laser machining apparatus 10 is an intersecting point between the jet liquid column 23 and the surface of the work piece 26 to be processed. When the jet liquid column 23 tilts, the machining point 26a is displaced. When the machining point 26a is displaced, the machined work piece results in a defect with the tracks of the machining points overlapped with one another in some cases. Further, upon the machining point 26a being displaced when three-dimensional machining is performed on the work piece 26 to be processed with the inclination of such piece to be processed changed, such problems arise as the machined work piece not taking a shape as initially planned.

The present method for cleaning a nozzle permits the foreign matters 41 attached on the periphery of the inlet opening 22c to be removed. At the time of using the laser machining apparatus 10, adopting the present method for cleaning a nozzle for every predetermined use period or for every predetermined number of cutting operations allows the periphery of the inlet opening 22c to keep clean. In turn, keeping the periphery of the inlet opening 22c clean prevents the jet liquid column 23 from tilting and the machining point 26a from being displaced. Further, it stabilizes the liquid flow on the periphery of the inlet opening 22c of the nozzle 22 so as to place the jet liquid column 23 into stability while stabilizing a quantity of the laser beam 13 which is introduced into the jet liquid column 23 and the state of a machining point 26a, thereby, fluctuation in the machining capacity of the apparatus being suppressed.

According to the present embodiment, the focal point 31 of the laser beam 13 is established within the liquid excitation chamber 21 during both machining and cleaning. If the focal point 31 is established within the window 20 or the nozzle body 22d, optical energy concentrates on the focal point 31, so that the window 20 or the nozzle body 22d continues to be damaged. According to the present embodiment, as the laser beam 13 is converged within the liquid excitation chamber 21, it prevents the body 15 and the nozzle 22 from being damaged by the laser beam 13.

An amount by which the foreign matters 41 are attached on the periphery of the inlet opening depends on the operating time of the laser machining apparatus 10. Thus, the control device 28 is designed so that it performs cleaning operation once every certain operating time or certain number of operations. For instance, the control device 28 performs cleaning operation once every time the operating time exceeds 10 hours before resuming the subsequent machining operation. When the nozzle 22 is not provided with the protection film 22e (see FIG. 2), it may be designed so that such cleaning operation is performed more frequently. In this case, for example, it is designed so that the same is performed every time the operating time exceeds three or five hours.

To note, the foreign matters 41 are not necessarily removed completely from the vicinal section 22h of the inlet opening 22c by cleaning operation. Just when the surface 22g is made smooth with the foreign matters 41 substantially removed from there, it does not hamper the liquid from flowing and prevents the jet liquid column 23 from tilting. It is desirable that the height of the foreign matters 41 after cleaning be controlled within the range in the order of 0 to 1 μm.

Second Embodiment

Figure 8:
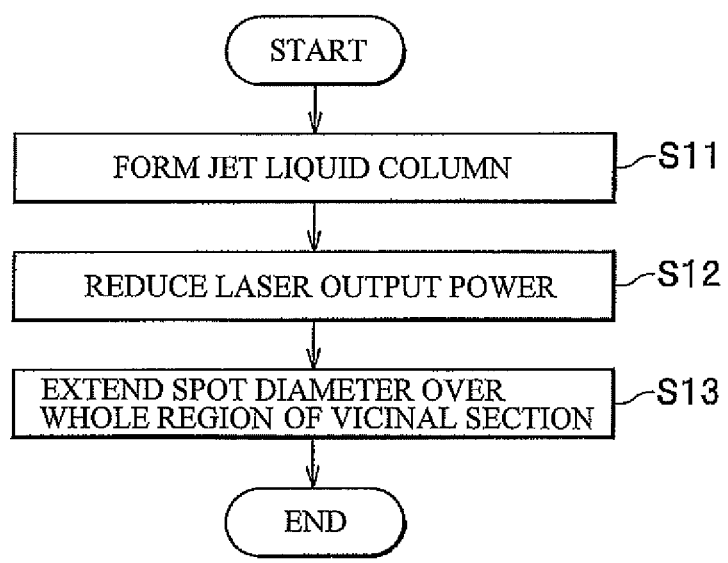
FIG. 8 is a flow chart illustrating a method for cleaning a nozzle according to the second embodiment of the present invention.
Figure 9:
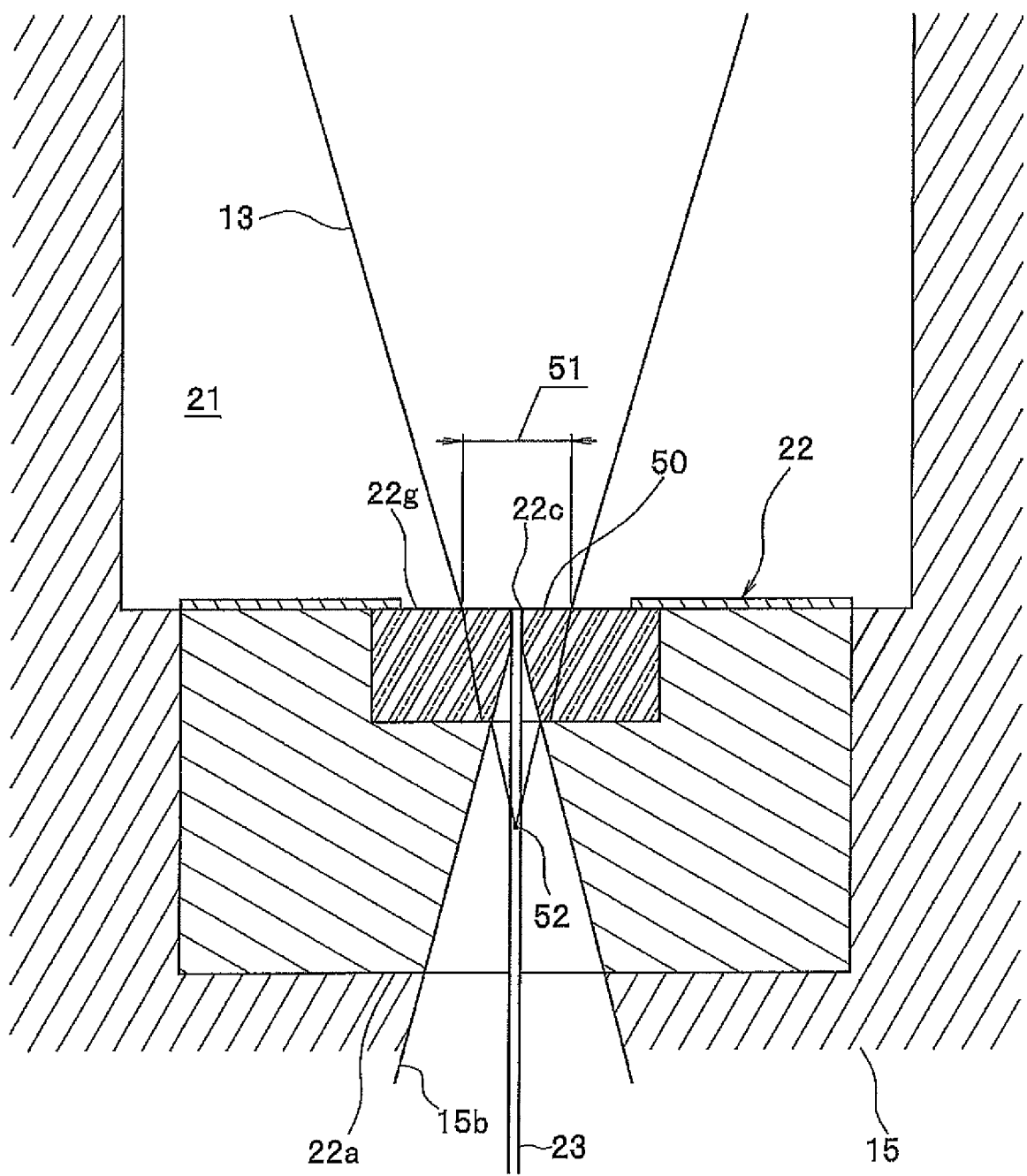
FIG. 9 shows a laser machining apparatus according to the second embodiment of the present invention, illustrating an enlarged longitudinal cross-sectional view in the vicinity of a liquid reception chamber when cleaning operation is being performed.

With reference to FIGS. 8 and 9, a method for cleaning a nozzle according to the second embodiment is described. A method for cleaning a nozzle according to the present embodiment is characterized in that the laser beam 13 is not converged within the liquid excitation chamber 21, but the laser beam 13 is adjusted so that the spot 50 of the laser beam 13 extends over the whole region of the vicinal section 22h of the inlet opening 22c. In other words, the foreign matters 41 attached on the nozzle 22 are removed by irradiating the laser beam over the whole region of the vicinal section 22h for a certain duration of time without making the spot 50 of the laser beam 13 scan such region. With the other aspects, the present embodiment is the same as the first one, so that the same structural components and steps are denoted with the same reference numerals, the explanations of which are omitted herein to avoid redundancy.

In this regard, it is desirable in practice that Step S12 be performed without the irradiation of a laser beam 13. At the instant when a small spot of the irradiated laser beam is formed, it leads to damaging the nozzle body 22d and the main body 22a even with a small laser output. Step S12 can be performed even without the irradiation of a laser beam 13 in practice because it is executed based on calculation results in the same way as Step S2 of the first embodiment mentioned above.

At Step S13, the control device 28 enlarges the spot diameter 51 so that the spot 50 of the laser beam 13 irradiated onto the surface 22g is concentric with the center of the inlet opening 22c and the spot diameter 51 spreads over the whole region of the vicinal section 22h from which the foreign matters 41 are to be removed. At this time, in the context of structural arrangement, a focal point 52 of the laser beam 13 is positioned lower than the inlet opening 22c. The focal point 52 is established so that it lies in a get-through passage 15a of the body 15 and the like to avoid the inside of a transparent member (e.g. the nozzle body 22d).

At this time, the output power of the laser beam 13 and the spot diameter 33 are adjusted so that the peak power per unit area of the spot 50 of the laser beam irradiated onto the surface 22g provided with the inlet opening 22c of the nozzle 22 does not go beyond a threshold value at which the nozzle 22 is damaged.

The control device 28 controls the laser machining apparatus so that it irradiates a spot 50 of the laser beam onto the vicinal section 22h of the inlet opening 22c in such a state that the peak power per unit area of the spot 50 of the laser beam irradiated onto the surface 22g does not go beyond a threshold value at which the nozzle 22 is damaged.

At this time, since the nozzle body 22d is made of such transparent materials as diamond and sapphire, the laser beam 13 transmits through the nozzle body 22d. Then, on account that the main body 22a is made of such metallic materials as stainless steel and titanium alloy, the laser beam 13 does not transmit through the main body 22a. Thereafter, the laser beam 13 is reflected by the surface of the main body 22a so as to be scattered. Because the output power of the laser beam 13 is reduced, there is no case where either the nozzle 22 or the machining head 14 is damaged by the reflected and scattered laser beam 13. The duration in which the laser beam is irradiated onto the vicinal section is determined in relation to the output power of the laser beam 13 and the spot diameter 51 where appropriate. Such duration is set substantially within a range of one second to five seconds.

EXAMPLE

The concrete example of the first embodiment is described as follows. The present example adopts a laser machining apparatus 10, in which the diameter of the inlet opening 22c is 0.05 mm; the nozzle body 22d is made of diamond; the protection film 22e is made of titanium nitride; and the laser beam 13 is a pulsed laser beam.

At Step S1, it is arranged so that the laser output is 10 W; the spot diameter 33 is 0.15 mm; and the peak power per unit area of the spot of the laser beam is 0.8 MW/mm$^2$. It is further arranged so that the scanning range 39 is in the range of 0.7 mm×0.7 mm centered on the inlet opening 22c; the pitch 38 shifted for scanning is 0.03 mm; and the scanning speed of the spot 30 of the laser beam is 15 mm/minute.

Figure 6:
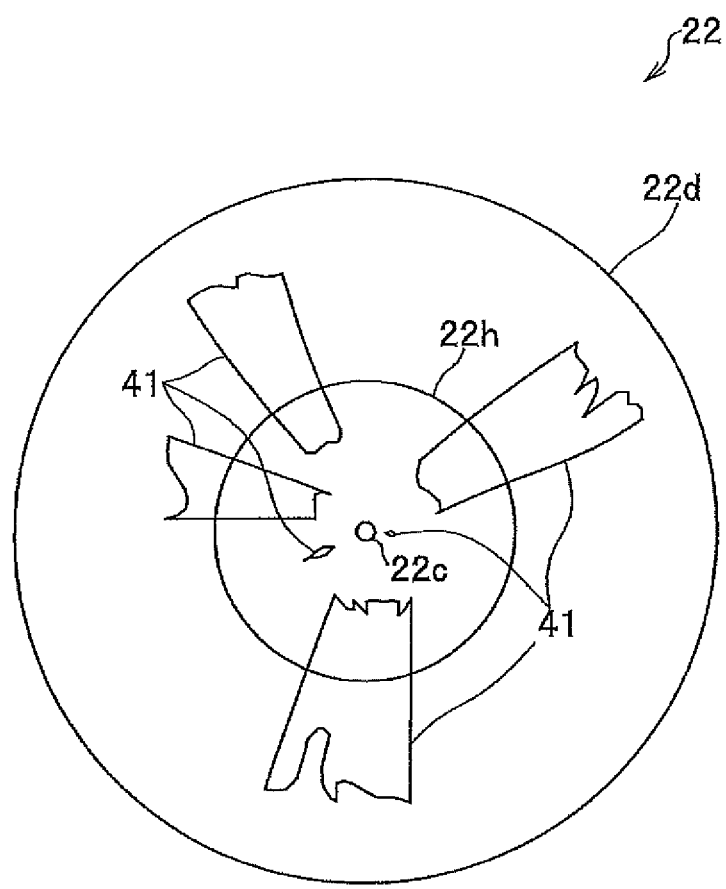
FIG. 6 is a view seen from the upper side of a nozzle before the nozzle is cleaned according to the first embodiment of the present invention.

With reference to FIG. 6, the foreign matters 41 before being cleaned are radially or substantially in a fan shape attached on the surface 22g on the periphery of the inlet opening 22c with centered on such opening. There is attached no foreign matter 41 directly in the vicinity of the inlet opening 22c. The foreign matters 41 are attached more thickly in the vicinity of the inlet opening 22c whereas they are attached thinner away from the inlet opening 22c. It was found that the thickness of the foreign matters 41 ranged from 3 to 10 μmμm.

Figure 7:
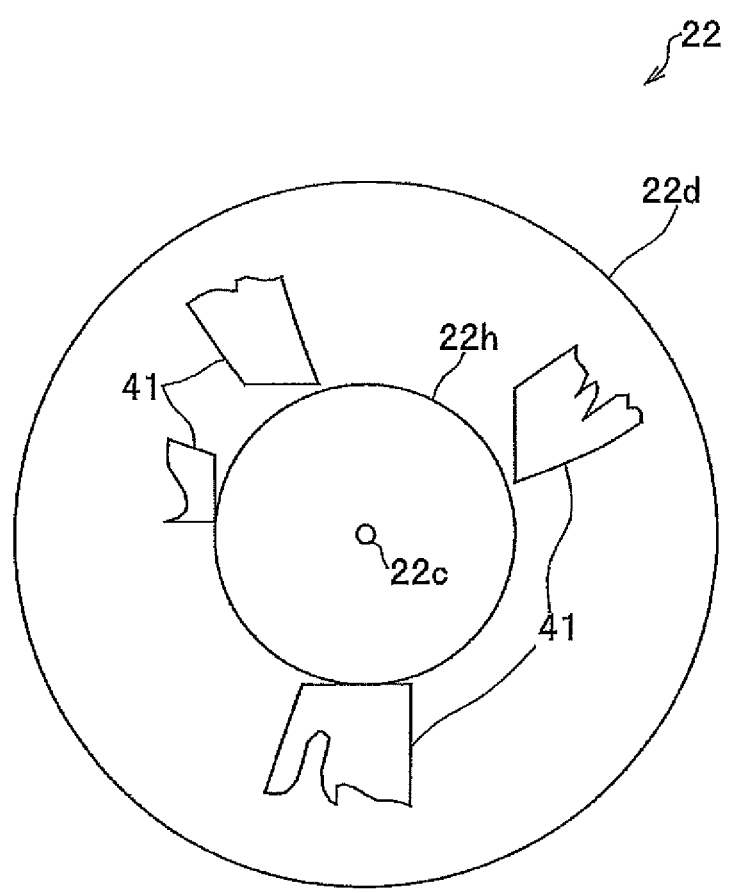
FIG. 7 is a view seen from the upper side of a nozzle after the nozzle is cleaned according to the first embodiment of the present invention.

Observing the nozzle 22 after the cleaning operation according to the present embodiment is performed, as illustrated in FIG. 7, hardly any foreign matter 41 is seen within the scanning range 39. The foreign matters 41 are remained as they are on the exterior of the scanning range 39. The thickness of the foreign matters 41 slightly remained within the scanning range 39, in other words, in the vicinal section 22h is reduced to 0.6 μm at the largest by removal. Then, the surfaces of the foreign matters 41 slightly remained within the scanning range 39 turn out to be smooth.

As the result of performing machining operation employing the laser machining apparatus 10 with the nozzle 22 after being cleaned, it is observed that neither the jet liquid column 23 tilts from the center axis nor the machining point 26a is displaced.

It should be noted that the present invention is not limited to the above-described embodiments and example, but is modified in various manner without deviating from the spirit thereof, in which the entire technical matters contained in the technical conceptions recited in the accompanying patent claims are the objects of the present invention. The above-described embodiments are preferred modes for carrying out the invention, but various substituted, amended, modified or improved examples would be realized by the persons skilled in the art based on the disclosure of the present specification, all of which are encompassed in the technical scope recited in the accompanying patent claims.

What is claimed is:

1. A method for cleaning a nozzle of a laser machining apparatus to process a work piece to be processed by a laser beam introduced into a jet liquid column, the method comprising the steps of:
   forming the jet liquid column by jetting a liquid from the nozzle; and
   irradiating a spot of the laser beam onto a vicinal section of an inlet opening of the nozzle in such a state that a peak power per unit area of the spot of the laser beam irradiated on a surface provided with the inlet opening of the nozzle does not go beyond a threshold value at which the nozzle is damaged and removing foreign matter attached on the surface,
   wherein the vicinal section is within a distance range from a center of the inlet opening which is five times or more, but 15 times or less as large as a diameter of the inlet opening,
   the threshold value is 1.0 MW/mm$^2$, and
   the step of removing the foreign matter comprises making the spot of the laser beam scan the vicinal section on the surface.

2. A method for cleaning a nozzle of a laser machining apparatus to process a work piece to be processed by a laser beam introduced into a jet liquid column, the method comprising the steps of:
   forming the jet liquid column by jetting a liquid from the nozzle; and
   irradiating a spot of the laser beam onto a vicinal section of an inlet opening of the nozzle in such a state that a peak power per unit area of the spot of the laser beam irradiated on a surface provided with the inlet opening of the nozzle does not go beyond a threshold value at which the nozzle is damaged and removing foreign matter attached on the surface,
   wherein the vicinal section is within a distance range from a center of the inlet opening which is five times or more, but 15 times or less as large as a diameter of the inlet opening,
   the threshold value is 1.0 MW/mm$^2$,
   the step of removing the foreign matter comprises making the spot of the laser beam scan the vicinal section on the surface,
   the laser machining apparatus comprises:
      the nozzle;
      a liquid reception chamber to receive the liquid for the inlet opening; and
      a window disposed on an upstream side with regard to the liquid reception chamber in an optical axis direction of the laser beam, and
   the step of removing the foreign matter comprises:
      making the laser beam converged within the liquid reception chamber; and having the spot of the laser beam formed on the surface with the spot of the laser beam spread from a position where the laser beam is converged.

\* \* \* \* \*